United States Patent
Teuteberg et al.

(10) Patent No.: US 7,337,871 B2
(45) Date of Patent: Mar. 4, 2008

(54) GEAR SUPPORT FOR MOUNTING A GEAR AND GEAR HAVING SUCH A GEAR SUPPORT

(75) Inventors: Rolf Teuteberg, Bietigheim (DE); Martin Bauer, Auenwald (DE); Ciro Cervo, Leinfelden (DE); Petra Kohler, Benningen (DE); Georg Lohmann, Pfedelbach (DE); Anton Noll, Neuenstein (DE); Markus Trefz, Löwenstein (DE); Andreas Allgoewer, Nellingen (DE); Roland Ries, Wimsheim (DE); Egon Eisenhauer, Heimsheim (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/289,765

(22) Filed: Nov. 29, 2005

(65) Prior Publication Data
US 2006/0157293 A1    Jul. 20, 2006

Related U.S. Application Data

(63) Continuation of application No. PCT/EP2004/005372, filed on May 19, 2004.

(30) Foreign Application Priority Data
May 30, 2003    (DE) ................................ 103 25 381

(51) Int. Cl.
*B60K 17/24* (2006.01)
(52) U.S. Cl. .................................................. 180/380
(58) Field of Classification Search ................ 180/346, 180/377–380, 312; 280/354, 360, 781
See application file for complete search history.

(56) References Cited

U.S. PATENT DOCUMENTS

| | | | | | |
|---|---|---|---|---|---|
| 3,940,162 | A | * | 2/1976 | Winslow et al. | 280/781 |
| 4,273,207 | A | * | 6/1981 | Sivers et al. | 180/380 |
| 4,386,792 | A | * | 6/1983 | Moore et al. | 280/781 |
| 5,267,623 | A | * | 12/1993 | Kashiwagi | 180/58 |
| 5,280,957 | A | * | 1/1994 | Hentschel et al. | 280/788 |

(Continued)

FOREIGN PATENT DOCUMENTS

DE     1 530 516 A    8/1961

(Continued)

OTHER PUBLICATIONS

International Preliminary Report on Patentability.

*Primary Examiner*—Paul N. Dickson
*Assistant Examiner*—Leonard McCreary, Jr.
(74) *Attorney, Agent, or Firm*—Knobbe Martens Olson & Bear LLP

(57) ABSTRACT

A gear support comprises an elongate carrier portion which is oriented along a longitudinal axis, and a flange portion at one end of the carrier portion. The flange portion serves for fastening the gear support to a case of the gear, and a bearing portion in the region of an opposite end of the carrier portion serves for mounting the gear support on the motor vehicle. The carrier portion has two mutually opposite longitudinal spars, between which ribs extend, the longitudinal spars and the ribs being produced in one piece with one another.

10 Claims, 3 Drawing Sheets

U.S. PATENT DOCUMENTS

| | | | |
|---|---|---|---|
| 5,741,026 A * | 4/1998 | Bonnville | 280/781 |
| 6,273,208 B1 * | 8/2001 | Sand | 180/299 |
| 2005/0140131 A1 * | 6/2005 | Smith | 280/781 |

FOREIGN PATENT DOCUMENTS

| | | |
|---|---|---|
| DE | 30 44 288 A | 11/1980 |
| DE | 34 42 584 A1 | 11/1984 |
| DE | 85 21 933.9 | 7/1985 |
| DE | 42 20 629 A1 | 6/1992 |
| DE | 196 13 895 A1 | 4/1996 |
| DE | 196 23 936 C1 | 6/1996 |
| DE | 196 24 002 A1 | 6/1996 |
| DE | 100 20 079 C1 | 4/2000 |
| DE | 101 46 592 C1 | 9/2001 |
| EP | 0 005 839 A | 5/1979 |
| GB | 2 314 055 | 12/1997 |
| JP | 63269721 | 11/1988 |

\* cited by examiner

US 7,337,871 B2

GEAR SUPPORT FOR MOUNTING A GEAR AND GEAR HAVING SUCH A GEAR SUPPORT

CROSS REFERENCE TO RELATED APPLICATIONS

This application is a continuation of International Application PCT/EP2004/005372, filed on May 19, 2004. This application is hereby incorporated by reference in its entirety.

BACKGROUND OF THE INVENTION

1. Field of the Invention

The present invention relates to a gear support for mounting a gear on a motor vehicle, in particular for axle gears, with an elongate carrier portion which is oriented along the longitudinal axis, with a flange portion at one end of the carrier portion, the flange portion serving for fastening the gear support to a case of the gear, and with a bearing portion in the region of an opposite end of the carrier portion, the bearing portion serving for mounting the gear support on the motor vehicle.

The present invention relates, furthermore, to a gear having such a flanged-on gear support.

2. Description of the Related Art

Gears (transmissions) are mounted on a motor vehicle, as a rule, at a plurality of suspension points. The bearing points must be suitable for supporting reaction moments which result from the fact that torques are transmitted via the gear.

In this respect, it is known to provide projecting gear supports on the gear case, in order to provide bearing points spaced apart from the case of the gear. This can serve, on the one hand, to "achieve" favorable bearing points on the motor vehicle. Also, the use of such gear supports can serve to increase the lever arm for absorbing the reaction moments. As a result, the reaction forces are reduced and it becomes possible to use softer rubber bearings. This leads, as a rule, to a better acoustic behavior of the drive train.

Examples of such gear supports are disclosed in the publications DE 196 24 002, DE 34 42 584, DE 196 23 936 C1 and DE 100 20 079 C1.

The gear supports are integrated partially into the case of the gear (for example, 100 20 079 C1) or are designed as separate elements (for example, DE 85 21 933 U1).

Furthermore, it is known from the drive train of the Porsche 996 with four-wheel drive to flange on the front-axle differential a gear support which, starting from the case of the front-axle differential, surrounds the cardan shaft. This gear support forms the closest prior art and has an elongate carrier portion in the form of a tube of approximately rectangular cross section. At one end of the carrier portion, a flange portion is provided, which serves for fastening to the case of the gear. In this instance, the flange portion may form part of the case, a shaft seal then, as a rule, being integrated into the flange portion in order to seal off the cardan shaft. At the other end of the carrier portion, a bearing portion in the form of an approximately circular lug integrally formed so as to be offset laterally with respect to the carrier portion is provided. A rubber bearing can be inserted into the lug. The gear support is produced by sand casting as a profile cast in one part.

Furthermore, it is known to design such gear supports as a drawn tube with pressed-in or welded-on end pieces which are produced as castings or forgings.

This type of design is comparatively costly in terms of production, since the gear support is produced from three individual parts which have to be joined together.

The gear support at the front-axle differential of the Porsche 996 is likewise comparatively uneconomical in terms of production.

In general, the acoustic behavior of such gear supports is also a problem. When a toothing of the drive train causes excitation, large closed radiation surfaces radiate airborne sound in the resonant range.

SUMMARY OF THE INVENTION

The object of the present invention is, consequently, to specify an improved gear support for mounting a gear on a motor vehicle, which, in particular, can be produced economically and has a favorable acoustic behavior. A further object of the invention is to specify a gear having a flanged-on gear support of this type.

In the gear support mentioned in the introduction, this object is achieved in that the carrier portion has two mutually opposite longitudinal spars, between which ribs extent, the longitudinal spars and the ribs being produced in one piece with one another (integrally).

Furthermore, the above object is achieved by means of a gear having a flanged-on gear support of this type.

By virtue of the measure of producing the carrier portion by means of a construction consisting of longitudinal spars and of ribs extending between these, on the one hand, the carrier portion can be produced more economically, for example by the die-casting method. Furthermore, the ribs make it possible to develop a favorable acoustic structure which leads to be a better acoustic behavior.

The object is thus achieved in full.

It is especially advantageous if the longitudinal spars are designed as plates which are oriented approximately parallel to one another in a direction transverse to the longitudinal axis.

By being produced in one piece with the ribs extending between them, these longitudinal spars are consequently stiffened and therefore cannot so easily be excited into oscillations which would lead to an unfavorable acoustic behavior.

In this instance, it is especially advantageous if the ribs are in each case plane.

This assists production by the die-casting method.

It is especially advantageous if the ribs are oriented obliquely to the longitudinal axis of the carrier portion.

In this embodiment, a high stability of the carrier portion is obtained both in the direction of torsion about a longitudinal axis and about an axis which is oriented perpendicularly to the longitudinal axis.

The gear support is consequently suitable particularly for torque support.

In this instance, it is especially advantageous if the ribs are arranged in a zigzag manner.

Moments about the longitudinal axis can thereby be absorbed effectively in both directions, particularly in the direction of torsion.

It is especially advantageous if the ribs are arranged in a sawtooth-like manner.

Increased stability can thereby be provided in a direction of torsion which depends on the usual direction of rotation (in the case of forward drive) of the shafts of the gear.

According to a particularly preferred embodiment, the flange portion, the bearing portion and the ribs have in each case orifices for leading through a drive shaft of the motor vehicle, the said orifices being aligned with one another in parallel, in particular coaxially to the longitudinal axis of the carrier portion.

In this embodiment, the gear support is suitable for leading through a drive shaft, in particular a cardan shaft for an axle differential. In general, however, it is also conceivable to lead through axle shafts of the differential.

Furthermore, the orifices afford the further advantage that, as a rule, the ribs, too, cannot form sound sources capable of being excited by resonance.

According to a further preferred embodiment, a stiffening element connects a radially outer edge of the flange portion to a longitudinally middle part of the carrier portion.

The weight of the gear is thereby introduced more favorable into the gear support in the manner of a framework.

In this instance, it is especially advantageous if the stiffening element is of plate-shaped design.

This makes it possible to implement a favorable tie-up both to the flange portion and to the carrier portion.

Furthermore, it is advantageous if there is arranged between the stiffening element and the carrier portion (upper longitudinal spar) at least one stiffening rib which is oriented approximately perpendicularly to the stiffening element and to the carrier portion (upper longitudinal spar).

As a result, a high rigidity can be set up, adjacent to the flange portion, in that part of the carrier portion which is subjected to particularly high mechanical stress.

According to a particularly preferred embodiment, the entire gear support is produced, overall, as a one-piece cast element.

The gear support can thereby be manufactured particularly economically. This is achieved in that a closed design, as in the prior art, is abandoned.

The design has the capability of removal from the mould on all sides and can be implemented without any undercut.

Particularly preferred material for the gear support are light metals, in particular aluminium.

The sandwich type of construction results in high mechanical strength, even without additional material. It goes without saying that the arrangement of the ribs and also of the arrangement and design of the stiffening element and stiffening rib, and, where appropriate, the arrangement of the stiffening element and stiffening rib can be calculated by means of finite-element methods.

Overall, therefore, the gear support according to the invention affords a better acoustic behavior, along with lower production costs. Moreover, a marked weight saving is obtained, as compared with closed designs.

By calculation according to the finite-element method (FE), the rib form may also assume other configurations, for example a wavy form in longitudinal section.

It goes without saying that the features mentioned above and those yet to be explained below can be used not only in the combination specified in each case, but also in other combinations or alone, without departing from the scope of the present invention.

Exemplary embodiments of the invention are illustrated in the drawing and are explained in more detail in the following description.

DETAILED DESCRIPTION OF THE INVENTION

Figure 1:
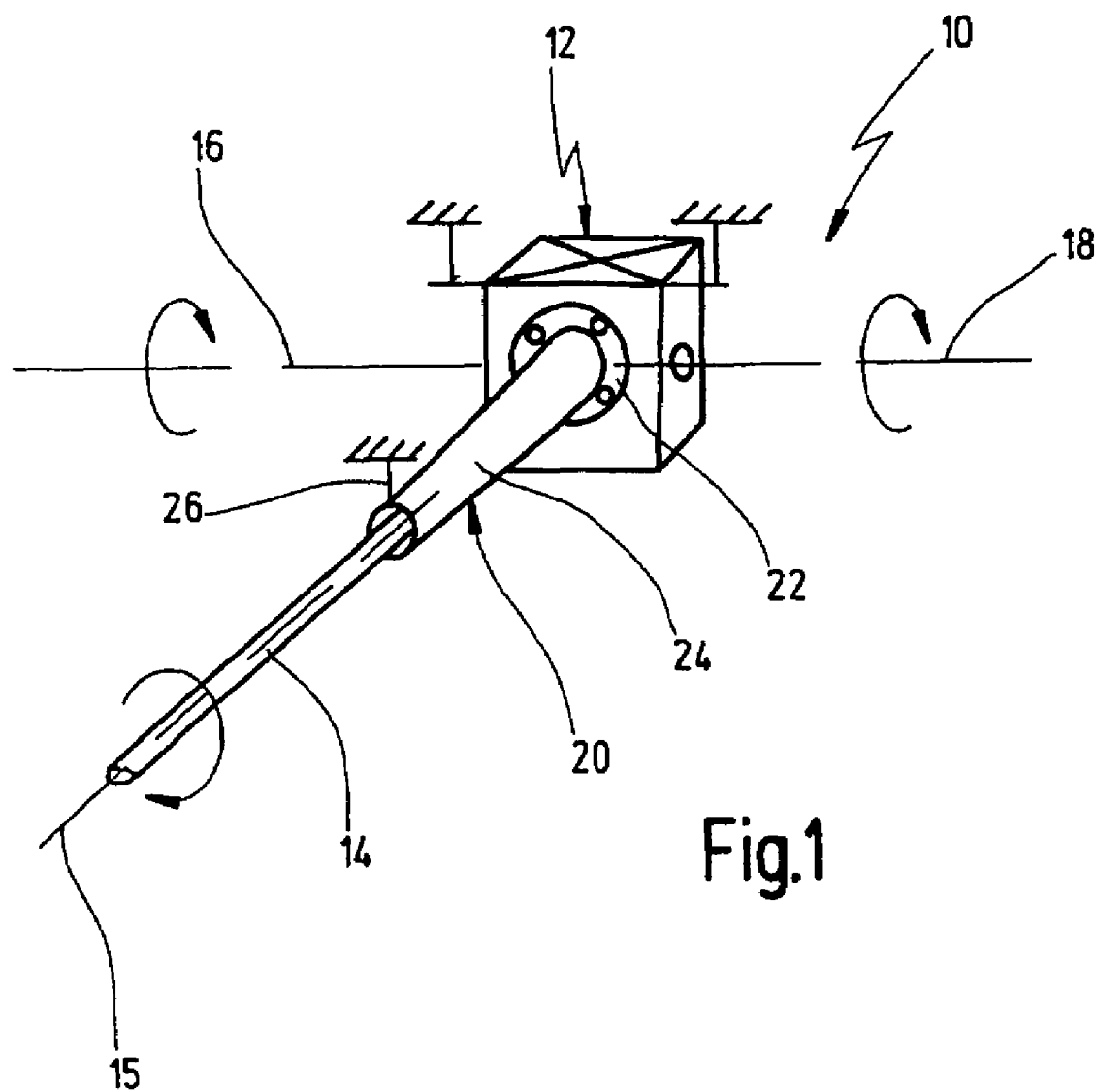
FIG. 1 shows a diagrammatic perspective arrangement of part of a drive train of a motor vehicle with an axle gear which is supported by means of a gear support.

In FIG. 1, part of the drive train of the motor vehicle is designated in general by 10.

The drive train 10 has an axle gear, in particular a differential 12, into which a cardan shaft 14 is led. The cardan shaft 14 is oriented along a longitudinal axis 15.

Two axle shafts 16, 18 for the drive of driven wheels of a motor vehicle extend laterally from the axle gear 12.

The axle gear 12 is mounted on the vehicle by means of three fastening points. Mounted on the vehicle may take place on the frame, on the chassis or on a crossmember, to mention examples.

Two of the fastening points of the axle differential 12 are provided directly in the region of the case of the axle gear 12. These bearing points are not designated in any more detail in FIG. 1.

A third bearing point lies at the end of a gear support 20 which is flanged onto the case of the axle gear 12.

The gear support 20 has a flange portion 22 which is fastened to the case of the axle gear 12. The flange portion 22 may in this instance form part of the case.

The flange portion has adjoining it an elongate carrier portion 24 which surrounds the cardan shaft 14. At the opposite end of the carrier portion 14 is provided a bearing portion 26, by means of which the gear support 20 is secured to the vehicle.

By the gear support 20 being mounted in a region distant from the actual case of the axle differential 12, reaction moments due to torque transmission via the axle gear 12 can be supported more effectively. It is possible for softer rubber bearings to be used, thus affording a better acoustic behavior of the drive train 10.

The flange portion 22 may be provided with an O-ring seat, in order to achieve sealing-off with respect to the case of the gear. Furthermore, a shaft seal for sealing off with respect to the cardan shaft 14 may be provided in the flange portion 22.

Figure 2:
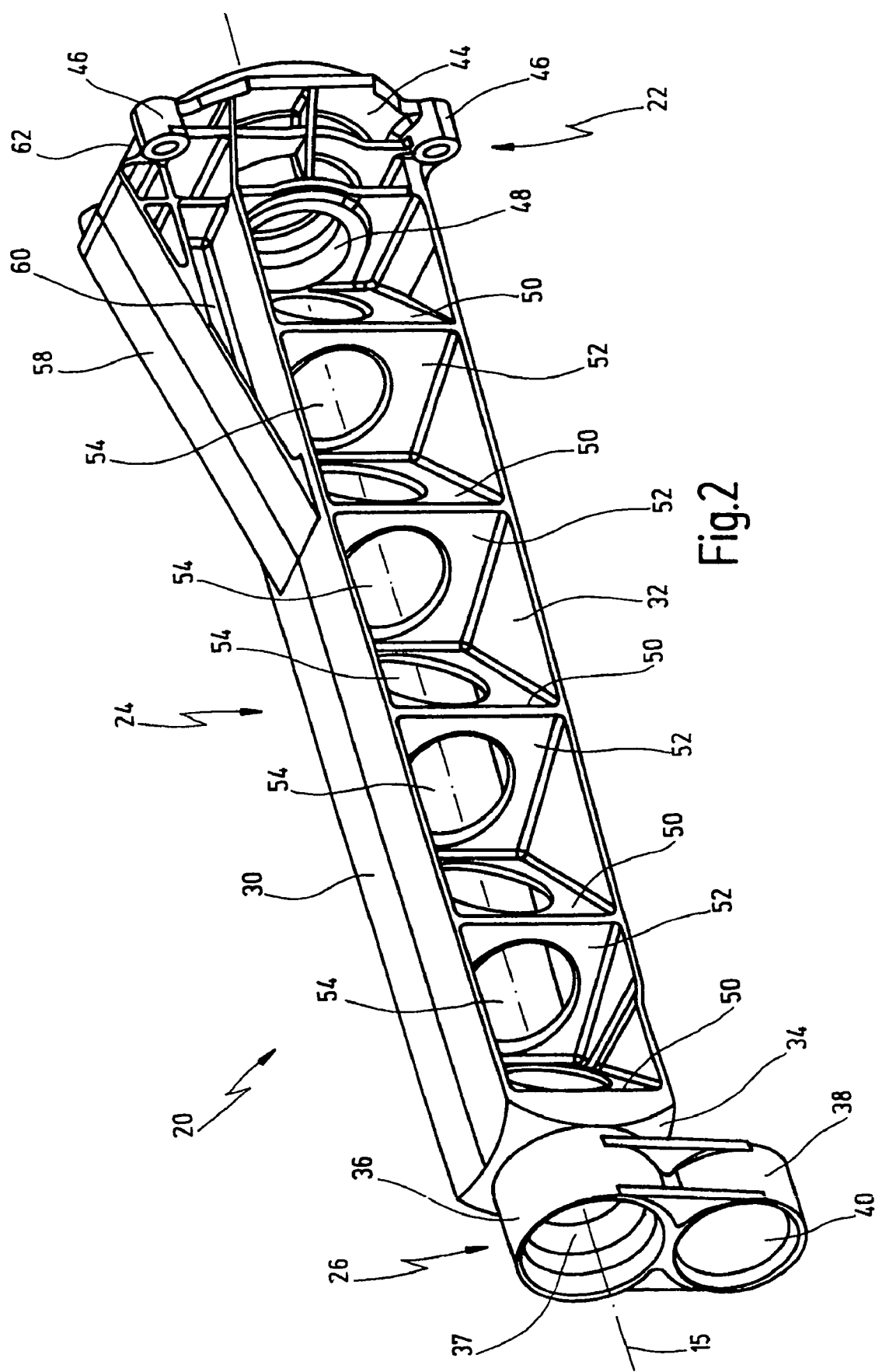
FIG. 2 shows an oblique rear perspective view of an embodiment of the gear support according to the present invention.
Figure 3:
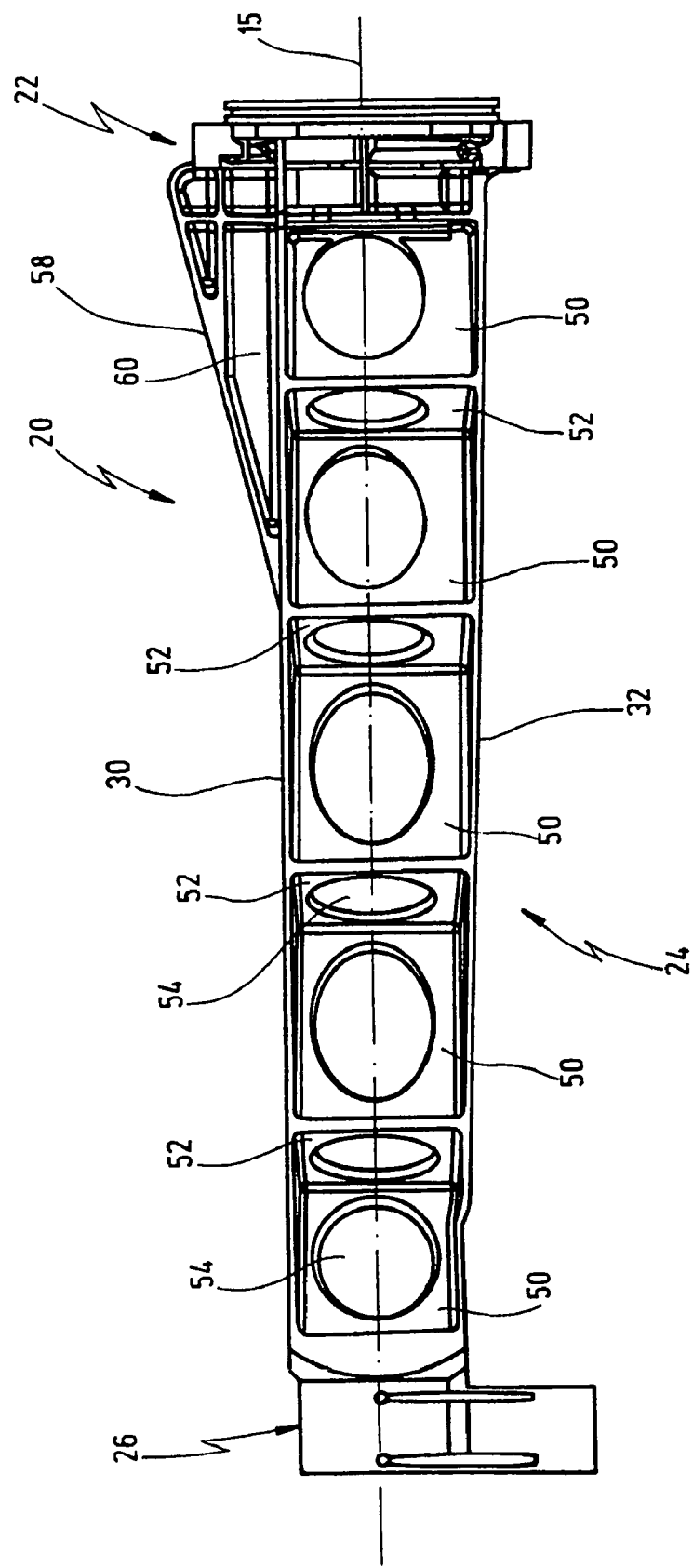
FIG. 3 shows a side view of the gear support of FIG. 2.

A gear support 20 according to a preferred embodiment of the present invention is illustrated in FIGS. 2 and 3.

The gear support 20 has an upper longitudinal spar 30 in the form of an elongate plate and a lower longitudinal spar 32 in the form of an elongate plate. The upper longitudinal spar 30 and the lower longitudinal spar 32 are provided on opposite sides of the longitudinal axis 15 and are oriented approximately parallel to one another in a direction transverse to the longitudinal axis 15. The longitudinal spars 30, 32 are likewise oriented parallel to one another in the direction of the longitudinal axis 15, but may be arranged (or bent) at an angle to one another.

In the region of the bearing portion, the longitudinal spars 30, 32 are connected by means of an escutcheon 34, from which a sleeve extension 36 extends. In the sleeve extension 36 is formed an orifice 37 which is aligned with the longitudinal axis 15.

A bearing sleeve 38 is integrally formed, offset in parallel with respect to the longitudinal axis 15, on the sleeve extension 36 and forms a lug 40. A rubber bearing for mounting the bearing portion 26 on the vehicle may be inserted into the lug 40.

The flange portion 22 has a flange wall 44 which extends approximately perpendicularly with respect to the longitudinal axis 15 and on which a plurality of mounting projections 46 are provided circumferentially. The mounting projections 46 have orifices (not designated in any more detail) for leading through connection bolts, screws, etc.

Furthermore, a central orifice 48 is provided in the flange wall 44 and is likewise aligned with the longitudinal axis 15.

Between the longitudinal spars 30, 32 extend first ribs 50 which are in each case oriented obliquely to the longitudinal axis 15. Furthermore, between the longitudinal spars 30, 32, second ribs 52 extend, which are likewise oriented obliquely to the longitudinal axis 15, but in the opposite direction to the first ribs 50.

The first ribs 50 and the second ribs 52 adjoin one another, so that a zigzag profile is formed.

More precisely, as can be seen particularly in FIG. 3, the first and the second ribs 50, 52 form a sawtooth profile.

This results, in the direction of torsion about the longitudinal axis 15, in somewhat increased rigidity on one side of the gear support 20. Moments of torsion can thereby be absorbed more effectively in that direction. This direction depends on the usual direction of rotation of the cardan shaft 14.

Furthermore, the first and the second ribs 50, 52 are designed with respective orifices 54 which are aligned with the longitudinal axis 15.

The orifices 37, 54 and 48 serve for leading through the cardan shaft 14.

It goes without saying, in this instance, that the size of the orifices 37, 54 and 48 is selected such that the gear support 20 does not touch the cardan shaft 14.

A stiffening element 58 is provided on the top side of the upper longitudinal spar 30. The stiffening element 58 extends from the middle part of the carrier portion 24 towards an upper edge portion of the flange portion 22. The stiffening element 58 is in this instance likewise of plate-shaped design.

Between the stiffening element 58 and the upper longitudinal spar 30 is provided a central stiffening rib 60, the plane of which runs approximately perpendicularly with respect to the planes of the upper longitudinal spar 30 and of the stiffening element 58.

In the region of the flange portion 22, further radially extending ribs are provided, although these are not designated in any more detail in FIGS. 2 and 3.

The gear support 20 is produced as a one-piece component and consists of light metal, in particular aluminium. The gear support is designed without undercuts and may be produced by the die-casting method.

What is claimed is:

1. A gear support for mounting a gear on a motor vehicle, with an elongate carrier portion which is oriented along a longitudinal axis, with a flange portion at one end of the carrier portion, the flange portion serving for fastening the gear support to a case of the gear, and with a bearing portion in the region of an opposite end of the carrier portion, the bearing portion serving for mounting the gear support on the motor vehicle, wherein the carrier portion has two mutually opposite longitudinal spars between which ribs extend, and wherein the longitudinal spars comprise plates which are oriented approximately parallel to one another and offset from the longitudinal axis, wherein the ribs are planar, and wherein the flange portion, the bearing portion and the ribs comprise orifices for leading through a drive shaft of the motor vehicle, the orifices being aligned with one another along the longitudinal axis of the carrier portion.

2. The gear support according to claim 1, wherein the ribs are oriented obliquely to the longitudinal axis and the carrier portion.

3. The gear support according to claim 2, wherein the ribs are arranged in a zigzag manner.

4. The gear support according to claim 3, wherein the ribs are arranged in a sawtooth manner.

5. The gear support according to claim 1, wherein a stiffening element connects a radially outer edge of the flange portion to a longitudinally middle part of the carrier portion.

6. The gear support according to claim 5, wherein the stiffening element is of plate-shaped design.

7. The gear support according to claim 5, wherein between the stiffening element and the upper longitudinal spar is arranged at least one stiffening rib which is oriented approximately perpendicularly to the stiffening element and to the longitudinal spar.

8. The gear support according to claim 1, wherein the gear support is produced as a one-piece cast element.

9. A gear support for mounting an axle gear on a motor vehicle, with an elongate carrier portion which is oriented along a longitudinal axis, with a flange portion at one end of the carrier portion, the flange portion serving for fastening the gear support to a case of the gear, and with a bearing portion in the region of an opposite end of the carrier portion, the bearing portion serving for mounting the gear support on the motor vehicle, wherein the carrier portion has two mutually opposite longitudinal spars between which ribs extend, the longitudinal spars and the ribs being produced in one piece, wherein at least some of the ribs are oriented obliquely to the longitudinal axis of the carrier portion, and extend back and forth across the longitudinal axis of the carrier portion.

10. A transmission for a vehicle, having a flanged-on gear support for mounting a gear on a motor vehicle, with an elongate carrier portion which is oriented along a longitudinal axis, with a flange portion at one end of the carrier portion, the flange portion serving for fastening the gear support to a case of the gear, and with a bearing portion in the region of an opposite end of the carrier portion, the bearing portion serving for mounting the gear support on the motor vehicle, wherein the carrier portion has two mutually opposite longitudinal spars between which ribs extend, and wherein the longitudinal spars comprise plates which are oriented approximately parallel to one another and offset from the longitudinal axis, wherein the ribs are planar, and wherein the flange portion, the bearing portion and the ribs comprise orifices for leading through a drive shaft of the motor vehicle, the orifices being aligned with one another along the longitudinal axis of the carrier portion.

* * * * *

UNITED STATES PATENT AND TRADEMARK OFFICE
CERTIFICATE OF CORRECTION

PATENT NO. : 7,337,871 B2
APPLICATION NO. : 11/289765
DATED : March 4, 2008
INVENTOR(S) : Rolf Teuteberg et al.

It is certified that error appears in the above-identified patent and that said Letters Patent is hereby corrected as shown below:

On the Title Page Item (73)
Under "Assignee:" please add -- Dr. Ing. H.C.F. Porsche Aktiengesellschaft, Stuttgart (DE) --

Signed and Sealed this

Sixth Day of January, 2009

JON W. DUDAS
*Director of the United States Patent and Trademark Office*

UNITED STATES PATENT AND TRADEMARK OFFICE
CERTIFICATE OF CORRECTION

PATENT NO.         : 7,337,871 B2
APPLICATION NO. : 11/289765
DATED              : March 4, 2008
INVENTOR(S)        : Rolf Teuteberg et al.

Page 1 of 1

It is certified that error appears in the above-identified patent and that said Letters Patent is hereby corrected as shown below:

On the Title Page Item -73-

Under "Assignee:" please replace "Stuttgard" with --Stuttgart--

Signed and Sealed this

Twelfth Day of May, 2009

JOHN DOLL
*Acting Director of the United States Patent and Trademark Office*